United States Patent [19]
Bullen

[11] Patent Number: 5,848,458
[45] Date of Patent: Dec. 15, 1998

[54] RECONFIGURABLE GANTRY TOOL

[75] Inventor: George Nicholas Bullen, Oxnard, Calif.

[73] Assignee: Northrop Grumman Corporation, Los Angeles, Calif.

[21] Appl. No.: 857,777

[22] Filed: May 15, 1997

[51] Int. Cl.⁶ .............................. B23Q 5/22; B23C 1/14
[52] U.S. Cl. ..................... 29/33 K; 29/34 B; 409/202; 409/212; 409/221
[58] Field of Search ................ 29/34 B, 26 A, 29/33 K, 524.1, 243.53; 409/202, 212, 216, 221, 213, 211, 224, 235; 227/66, 58; 408/71, 234

[56] References Cited

U.S. PATENT DOCUMENTS

| | | | |
|---|---|---|---|
| 4,644,635 | 2/1987 | Murai et al. | 409/221 X |
| 4,678,381 | 7/1987 | Bailey | 409/221 X |
| 4,838,531 | 6/1989 | Corsi | 269/21 |
| 4,987,668 | 1/1991 | Roesch | 409/212 X |
| 5,121,907 | 6/1992 | Engwall | 269/21 |
| 5,154,643 | 10/1992 | Catania et al. | 29/34 B |
| 5,174,555 | 12/1992 | Lossing | 269/71 |
| 5,181,809 | 1/1993 | Martin | 408/3 |
| 5,220,718 | 6/1993 | Speller, Sr. et al. | 29/431 |
| 5,314,397 | 5/1994 | Mills et al. | 29/26 A X |
| 5,611,130 | 3/1997 | Rummell et al. | 29/33 K X |

*Primary Examiner*—William R. Briggs
*Attorney, Agent, or Firm*—Terry J. Anderson; Karl J. Hoch, Jr.

[57] ABSTRACT

The present invention is embodied in a reconfigurable gantry tool and a reconfigurable tool system. The reconfigurable tool includes a platform, a reconfigurable holding mechanism, a gantry frame, a multi-axis numerically controlled robotic tool, a multi-movement control device coupled to the mobile multi-axis tool, and a rotatable and translatable sine plate. The reconfigurable gantry tool system comprises a plurality of reconfigurable gantry tools strategically coupled to one another to form a non-matrix assembly line. Other tooling systems can be coupled to and/or within the reconfigurable gantry tool system for performing additional operations.

21 Claims, 9 Drawing Sheets

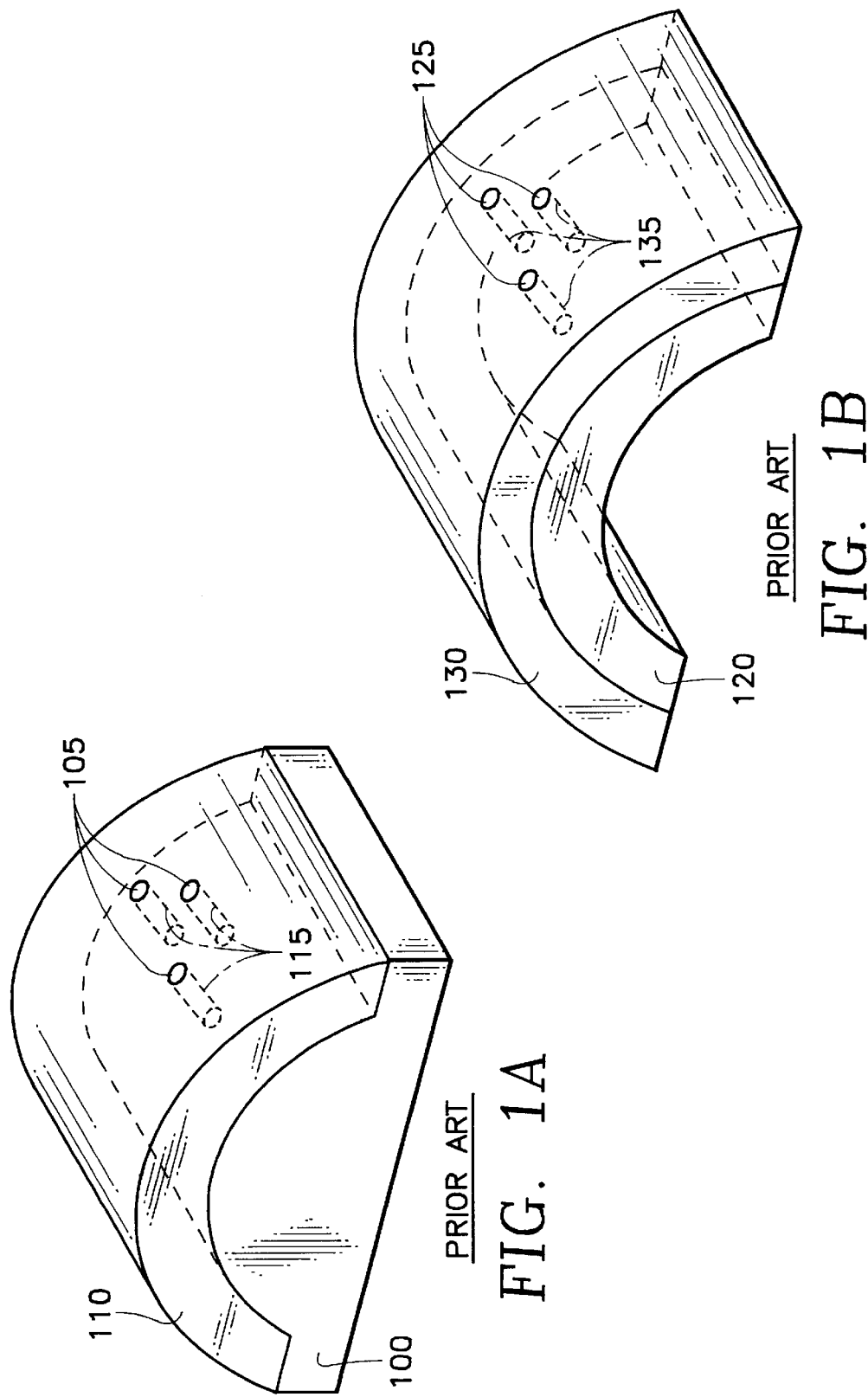

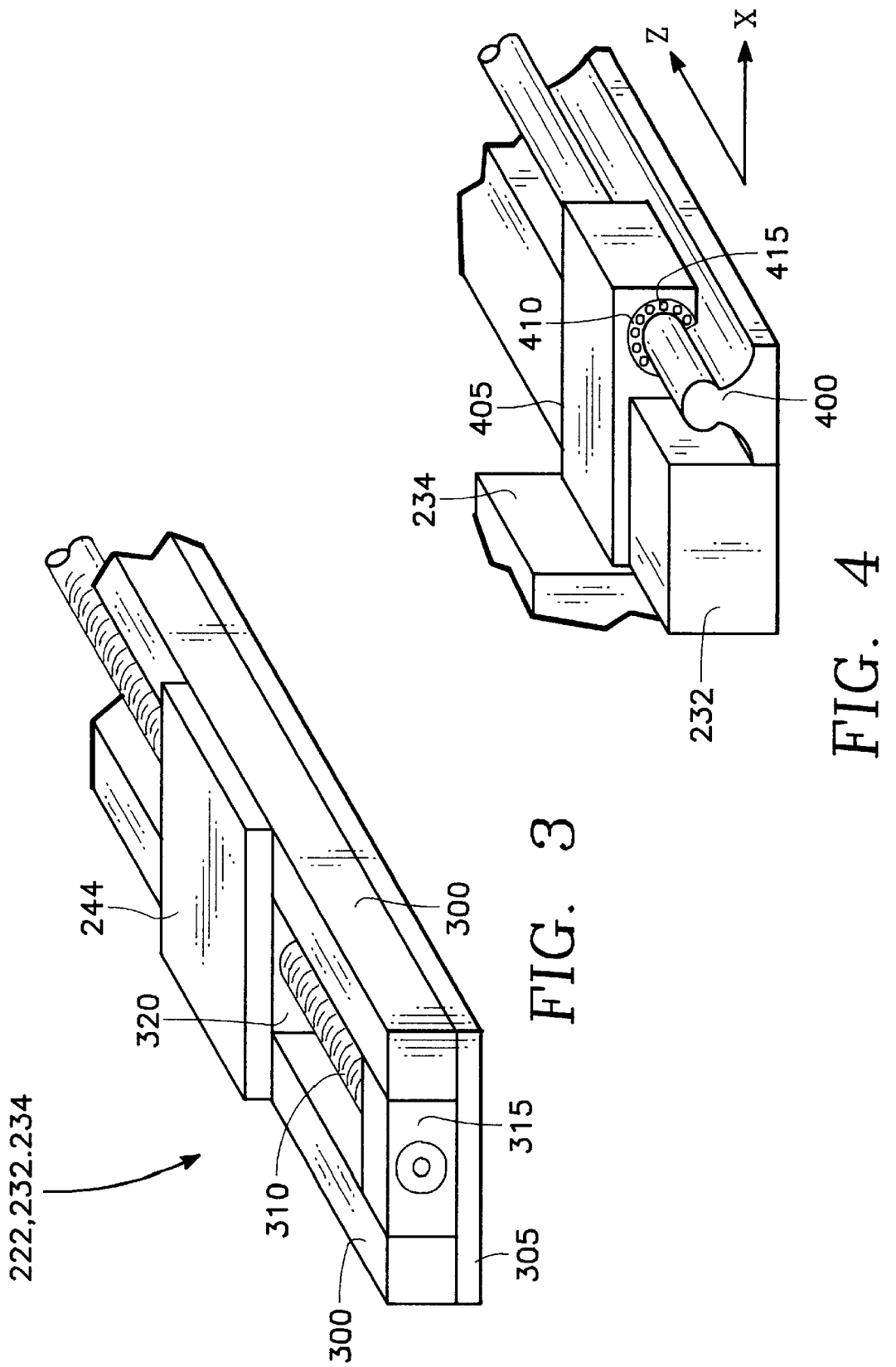

RECONFIGURABLE GANTRY TOOL

BACKGROUND OF THE INVENTION

1. Field of the Invention

The present invention relates in general to gantry tools and, in particular, to reconfigurable precision gantry tools and reconfigurable tooling systems for performing tooling operations on workpieces and assembling structures.

2. Related Art

The precision machining of large workpieces requires the use of a wide array of expensive machine tools such as full size models and gauges, templates, fixtures, drill hoods, and drill-sets. These tools have a substantial acquisition and maintenance costs, as well as costs related to their storage, property management, inspection, reinspection, and accountability. In addition, the manufacturing tolerances and repeatability achievable with these tools is limited.

For example in the aerospace industry, large airframe components such as fuselage sections can be precision machined only with the use of very costly full size models and gauges. A typical series of models needed to drill precision holes is shown in FIGS. 1A–2B. As shown in FIG. 1A, the first step in this process is to fabricate a male master model 100 of a fuselage section, which model is made of metal or plaster and has projections 105 of the size and at the locations required for the holes to be drilled in the fuselage section. A female plaster cast 110 is formed over the model 100, which cast has apertures 115 formed over the projections 105.

As shown in FIG. 1B, a male cast back 120 is formed from the plaster cast 110, which cast back is also made from plaster. Again, projections 125 are formed by the plaster flowing into the apertures 115 in the cast 110 of FIG. 1A. Finally, a drill bonnet 130 made of a composite material, such as fiberglass or graphite composite, is formed over the cast back 120. The bonnet 130 has apertures 135 of the correct size and at the correct locations where holes are required to be drilled.

The first step in using the bonnet 130 is to fasten a fuselage section into an assembly jig using bracing means, or "details", and locator pins to provide a reference position for the fuselage. The bonnet 130 is then secured adjacent the fuselage section and aligned with the section using the locator pins. The bonnet 130 then serves as a drilling template through which holes are drilled into the fuselage section. It should be noted that FIGS. 1A and 1B are basic drawings and show only a few holes for simplicity. An actual bonnet will have hundreds and possibly thousands of holes.

As such, the cost to fabricate a typical drill bonnet 130 can average $1 million and take from 1 to 12 months. As an example, for the F-18 aircraft, 900 bonnets are needed to drill all the fuselage holes. Thus, the total cost for the drill bonnet tool family for the F-18 is approximately $1 billion. Full scale interior models, called master gages, are also required to precisely locate and drill holes in details which are attached to interior structures of the assembly jig. These details are used to locate bulkheads, frames and ribs of the aircraft. Such master gages can cost between $5–10 million each and the F-18 requires 33 such master gages, for a total master gage tool family cost of approximately $250 million. In addition, new master models and gages need to be fabricated for either a new aircraft component or changes to an existing one, requiring from four to 24 months to prepare.

Therefore, what is needed is a device that eliminates the need for costly tool families, such as drill hoods, master models, gauges and facility fixtures. What is also needed is a device that is inexpensive and is made from standardized parts to reduce cost and fabrication time. What is also needed is a device that is reconfigurable and for custom tooling operations. Further, what is needed is a device having a leveling mechanism with a programmable memory to improve accuracy of hole location and to allow repetitive tooling operations.

Moreover, the large assembly jigs, large drill bonnets, drill tools, and drill hoods discussed above are used to assemble an entire structure, such as an aircraft. This process is referred to as a fixed custom matrix. This is because each different workpiece, no matter how slight the difference, must have its own custom assembly jig since the jigs are not reconfigurable. In this painstaking and expensive process, for each custom jig, tooling operations are performed only one workpiece at a time. Expensive work stands are elevated above the ground and are built around each custom assembly jig to allow workers to perform tooling operations on the workpiece. As a result, the expensive custom assembly jigs are the building blocks of the structure to be built. Consequently, this technique is very expensive, inefficient, and wastes resources.

Therefore, what is needed is an apparatus and method for assembling large structures without fixed custom matrices. What is additionally needed is a new assembly line with reconfigurable tools for assembling large structures. What is further needed is a new assembly line which uses the workpieces that comprise the final structure as the building blocks of the final structure and not the custom assembly jigs.

Whatever the merits of the above mentioned systems and methods, they do not achieve the benefits of the present invention.

SUMMARY OF THE INVENTION

To overcome the limitations in the prior art described above, and to overcome other limitations that will become apparent upon reading and understanding the present specification, the present invention is embodied in a reconfigurable gantry tool and a reconfigurable tool system. The reconfigurable tool includes a platform, a reconfigurable holding mechanism, a gantry frame, a multi-axis numerically controlled robotic tool, a multi-movement control device coupled to the mobile multi-axis tool, and a rotatable and translatable sine plate.

In one embodiment of the present invention, the reconfigurable gantry tool system comprises a plurality of reconfigurable gantry tools strategically coupled to one another to form a non-matrix assembly line. Other tooling systems can be coupled to and/or within the reconfigurable gantry tool system for performing additional operations.

The sine plate is rotatably and slidably coupled to the platform, and preferably rotates from a horizontal zero degree position to a vertical 90 degree position and translates along the platform. The gantry frame is slidably coupled to the platform. The robotic tool is movably coupled to the gantry frame and has a multi-axis range of motion. A workpiece is secured to the sine plate by the reconfigurable holding mechanism. A plurality of workpieces can be clamped together and coupled to the reconfigurable holding mechanism.

The multi-axis numerically controlled robotic tool has proximity sensors for precisely locating and positioning the tool within and around the workpiece. The tool can therefore perform numerous tooling operations on the workpiece. The proximity sensors precisely locate and align the tool with the workpiece before tooling operations are performed on the workpiece. In addition, the platform can have a self leveling system with a configurable memory, such as the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference. As such, precision tooling operations can be performed on the workpiece.

The self leveling system senses and changes the inclination of the platform. The self leveling device includes a lifting device affixed under a horizontal member, a level sensing device affixed to the member for sensing an inclination of the member, a computer for inputting a desired orientation of the manufacturing plane with respect to the horizon, a device for comparing the sensed inclination of the horizontal member with the desired orientation, a device for computing a change in the sensed inclination to achieve the desired orientation, and a device to transmit a control signal proportional to the change to the lifting device for achieving the desired orientation of the manufacturing plane.

A feature of the present invention is its reconfigurability. Another feature of the present invention is its ability to precisely locate and perform tooling operations. Another feature of the present invention is its ability to assemble parts without a fixed jig assembly. Yet another feature of the present invention is its self leveling mechanism with configurable memory.

An advantage of the present invention is that it eliminates the need for costly tool families. Another advantage of the present invention is that it increases the speed with which a part can be assembled, or implement engineering changes to an existing workpiece design with reduced costs. Yet another advantage of the present invention is its ability to perform repetitive tooling operations with reconfiguration.

The foregoing and still further features and advantages of the present invention as well as a more complete understanding thereof will be made apparent from a study of the following detailed description of the invention in connection with the accompanying drawings and appended claims.

BRIEF DESCRIPTION OF THE DRAWINGS

Referring now to the drawings in which like reference numbers represent corresponding parts throughout:

FIG. 1A is a perspective view of a prior art mold used to fabricate a drill positioning bonnet;

FIG. 1B is a perspective view of a prior art mold used to fabricate a drill positioning bonnet;

FIG. 3 is a perspective view of a portion of the system of FIG. 2B showing a translation module;

FIG. 4 is a perspective view of a portion of a second embodiment of the system of FIG. 2B showing a ballrail and pad assembly;

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 2A:
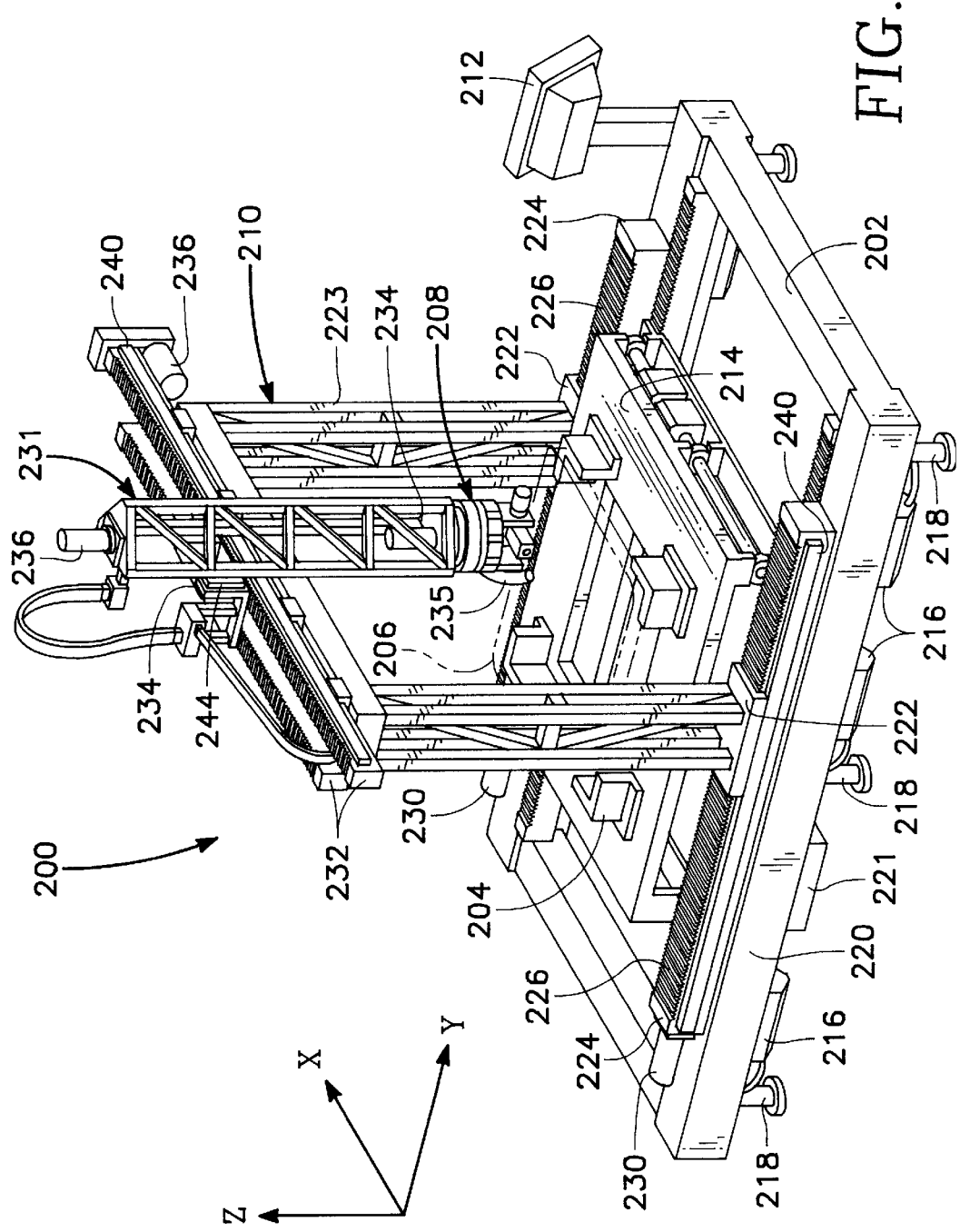
FIG. 2A is a perspective view of the mobile positioning system of the present invention.

FIG. 2A is a perspective view of the reconfigurable gantry tool of the present invention. The reconfigurable gantry tool 200 of the present invention includes a platform 202 for supporting a reconfigurable holding mechanism 204, a workpiece 206 coupled to the reconfigurable holding mechanism 204, a multi-axis numerically controlled robotic tool 208 coupled to a gantry frame 210, a multi-movement control 212 device coupled to the tool 200, and a rotatable and translatable sine plate 214.

In addition, the platform 202 can have a self leveling system 216 with a configurable memory, such as the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference. As such, precision tooling operations can be performed on the workpiece.

The self leveling system 216 senses and changes the inclination of the platform 202. The self leveling device 216 includes a lifting device 218 affixed under a horizontal member 220, a level sensing device 221 affixed to the horizontal member 220 for sensing an inclination of the horizontal member 220, a computer 212 for inputting a desired orientation of the manufacturing plane with respect to the horizon, a device for comparing the sensed inclination of the horizontal member 220 with the desired orientation, a device for computing a change in the sensed inclination to achieve the desired orientation, and a device to transmit a control signal proportional to the change to the lifting device 218 for achieving the desired orientation of the manufacturing plane.

The reconfigurable gantry tool 200 has a longitudinal translation module 222 positioned parallel to an Y axis. The function and construction of the longitudinal translation module 222 are similar to other translation modules used in the invention for transverse and vertical movement as explained below. The longitudinal translation module 222 is slidably coupled to the platform 202 and translates along the Y axis.

Movement of the longitudinal translation module 222 along the Y axis can be achieved, for example, by having dual longitudinal translation modules 222 engaged in corresponding translation rails 224. Any suitable arrangement for allowing the longitudinal translation module 222 to translate along the Y axis can be used, such as a carriage belt/drive arrangement 226 with synchronized servo motors 230 controlled by the controller 212. Also, the longitudinal translation module 222 is preferably removably attached to the platform 202 to allow tool 208 or frame 210 cleaning or other maintenance. The module 222 translates along rails 224 in response to servo motors 230, by control means described below.

The reconfigurable gantry tool 200 additionally includes a robotic arm 231 coupled to a transverse translation module 232 and having a vertical translation module 234. The robotic arm 231 is coupled to the transverse translation module 232 on one end and to the robotic tool 208 at another end. The robotic tool 208 can be any suitable tool, such as a drill, sealer, countersinker, etc., for performing tooling operations on the workpiece. In addition, vacuum cleaners 235 can be located near the tool 208 for accumulating waste from the tooling operation.

The transverse translation module 232 is preferably parallel to the X axis. The vertical translation module 234 is preferably parallel to the Z axis. The robotic arm 231 is slidably coupled to the transverse translation module 232. This arrangement facilitates transverse movement along the X axis. The vertical translation module 234 is slidably coupled to the robotic arm 231. This arrangement facilitates vertical movement along the Z axis. Both modules are driven by respective servo motors 236. The motors 236 may be connected to the modules 232, 234 either by a belt reduction drive 238, gear drive, or a direct.

The gantry frame 210 and all the translation modules 222, 232, 234 also include linear sensors 240 located along a length of the respective frame or module. The sensors 240 are feedback sensors, such as laser sensors, glass scales or digital strips (discussed below in detail). Glass scales or digital strips generally have a length of approximately the same length as the frame or translation module on which it is mounted.

In a preferred embodiment, the longitudinal translation module 222 comprises dual support bridge members 223. Bridge members 223 support the transverse translation module 232, parallel to the X axis and driven by a servo motor 230. This combined structure forms a bridge over the work envelope with longitudinal translation modules 222 on either side of the bridge. The motor 230 is connected to the longitudinal translation module 222 either by a belt reduction drive, gear drive, or a direct drive.

Figure 2B:
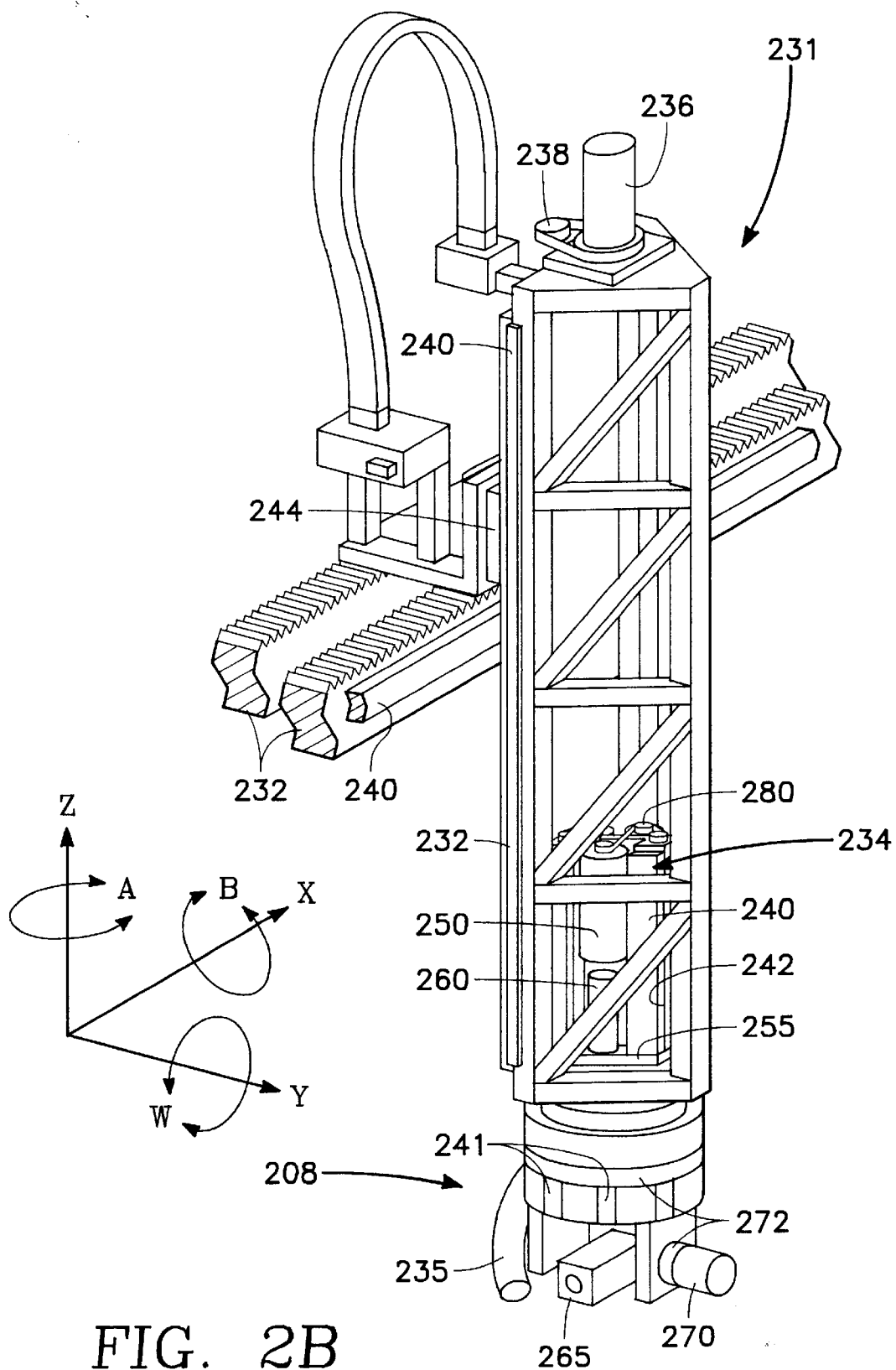
FIG. 2B is a perspective view detailing the robotic tool of the mobile positioning system of the present invention.

Referring to FIG. 2B along with FIG. 2A, the robotic tool 208 is preferably a multi-axis computer numerical controlled (CNC) gantry for performing specific tasks on the workpiece 206. The robotic tool 208 preferably has proximity sensors 241 for precisely locating and positioning the tool 208 within and around the workpiece 206. The tool 208 can therefore perform numerous precise tooling operations on the workpiece 206. The proximity sensors 241 precisely locate and align the tool 208 with and/or within the workpiece 206 before tooling operations are performed on the workpiece 206. Also, this arrangement allows the tool 208 to be an inspection device.

In addition, the robotic tool 208 can include dual sub-modules 242 and sliding pads 244 driven by a single servo motor 250. Dual sub-modules 242 provide additional strength to support and prevent back pressure from a machining operation from displacing the structure, which could cause machining errors. The dual sub-modules 242 also include sensors 240 along their length. Again, the motor 250 may be connected to the sub-modules 242 either by a belt reduction drive 238, 280, gear drive, or a direct drive. The belt reduction drives 238, 280 or gear drives provide increased accuracy in translational movement of the sliding pads 244.

The sub-modules 242 translate a carriage 255 on which a rotation motor 260 is mounted in order to rotate a machine tool 265 around an A axis. In accordance with one preferred embodiment of the invention, the machine tool 265 will be an electric drill for forming apertures in the workpiece. A pivot motor 270 is also mounted on the carriage 255 and the pivot motor rotates the machine tool 265 along all axes, depending on the position of the rotation motor 260. Rotational sensors 272 are mounted on each of the rotational motor 260 and pivot motor 270 to measure the angular rotation of the motors. As a result, rotation about the A, B, and W axes are achieved.

Further, the vertical arrangement of robotic arm 231 provides the ability of the tool 208 to perform tooling operations inside closed members. For example, tooling operations can be performed within ducts, which are one of the most difficult areas to perform tooling operations on when building an aircraft. Also, the vertical arrangement of the arm 231, instead of a horizontal arrangement, eliminates arm deflections that work against, rather than with, gravity.

FIG. 3 is a perspective view of a portion of the system of FIG. 2B showing a translation module. The translation modules 222, 232, and 234 can use conventional ballscrew drive construction, which provides accurate control at a minimum cost. As shown in FIG. 3, each module 222, 232, and 234 consists of guide rails 300 and a ball lead screw 310 mounted in a parallel position between the rails 300. The ball lead screw 310 is supported at both ends of the module by bearings 315, which are mounted on a support plate 305 that also supports the rails 300.

The pad 244 includes a threaded guide 320 which is positioned adjacent and between the rails 300 and engages the screw 310. As the screw 310 turns, the sliding pad 244 translates along the rails 300. The screw 310 can be coupled directly to a servo motor, such as the motor 236 in FIG. 2B, or by means of the belt reduction drives 238, 280 or gear drives.

FIG. 4 is a perspective view of a portion of a second embodiment of the system of FIG. 2B showing a ballrail and pad assembly. In this embodiment of the invention, a ballrail 400 is mounted near the module 232 and is parallel to the transverse module 232. Further, the ballrail 400 is positioned on the opposite side of the module 232 from the transverse translation module 234 and is connected to the transverse translation module by a modified sliding pad 405, which translates along the module 232 in a manner identical to sliding pad 244 (shown in FIG. 2B). The pad 405 is operatively connected to the ballrail 400 at a semicircle 410 whose ballrail facing surface is covered with ball bearings 415. The ballrail 400 and pad 405 assembly (a "ballrail and pad assembly") allows translation along the Z axis, but prevents motion of the pad 405 is the X direction.

The advantage of this ballrail and pad assembly is to offset the lever arm produced by the transverse translation module 234 about the module 232, thus improving stability of the machine tool 265 (shown in FIG. 2B) during machine operations. For example during a drilling operation, a resistance force ("drill-back") may develop that can displace the drill and reduce the hole accuracy. The effect of drill-back is substantially reduced by the ballrail and pad assembly.

Referring back to FIG. 2A, the preferred self leveling system 216 of the present invention is similar (differences discussed below) in principle and in operation to the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference.

The preferred leveling system 216 of the reconfigurable tool 202 comprises an adjusting mechanism, such as flat stands, lifting devices 218, such as jacks, a horizontal member 220, a level sensing device 221 affixed to the member 220 for sensing an inclination of the member 220, and a computer module as part of controller 212 for inputting a desired orientation of the manufacturing plane with respect to the horizon. Each adjusting mechanism is preferably affixed to a respective jack 218, each of which are preferably affixed to the member 220.

Sensor cables (not shown) and lifting device cables (not shown) connect the sensors and lifting devices, respectively, to the controller 212. A suitable comparing device (not shown) compares the sensed inclination of the horizontal member 220 with the desired orientation and another device (not shown) computes changes in the sensed inclination to achieve a desired orientation. Also, another device (not shown) transmits a control signal proportional to the change to the lifting devices 218 for achieving the desired orientation of the manufacturing plane.

The leveling system 216 is a multi function system. For instance, some of the functional attributes of the system include the ability to store in memory location heights of different support assemblies. This facilitates quick and precise attachment to a certain support assembly during mobile transport from one support assembly to another. Also, the leveling system 216 has dormant storage leveling capabilities. This function allows storage of certain location heights in memory, thereby preventing racking of the system frame from storage on uneven surfaces.

Figure 5:
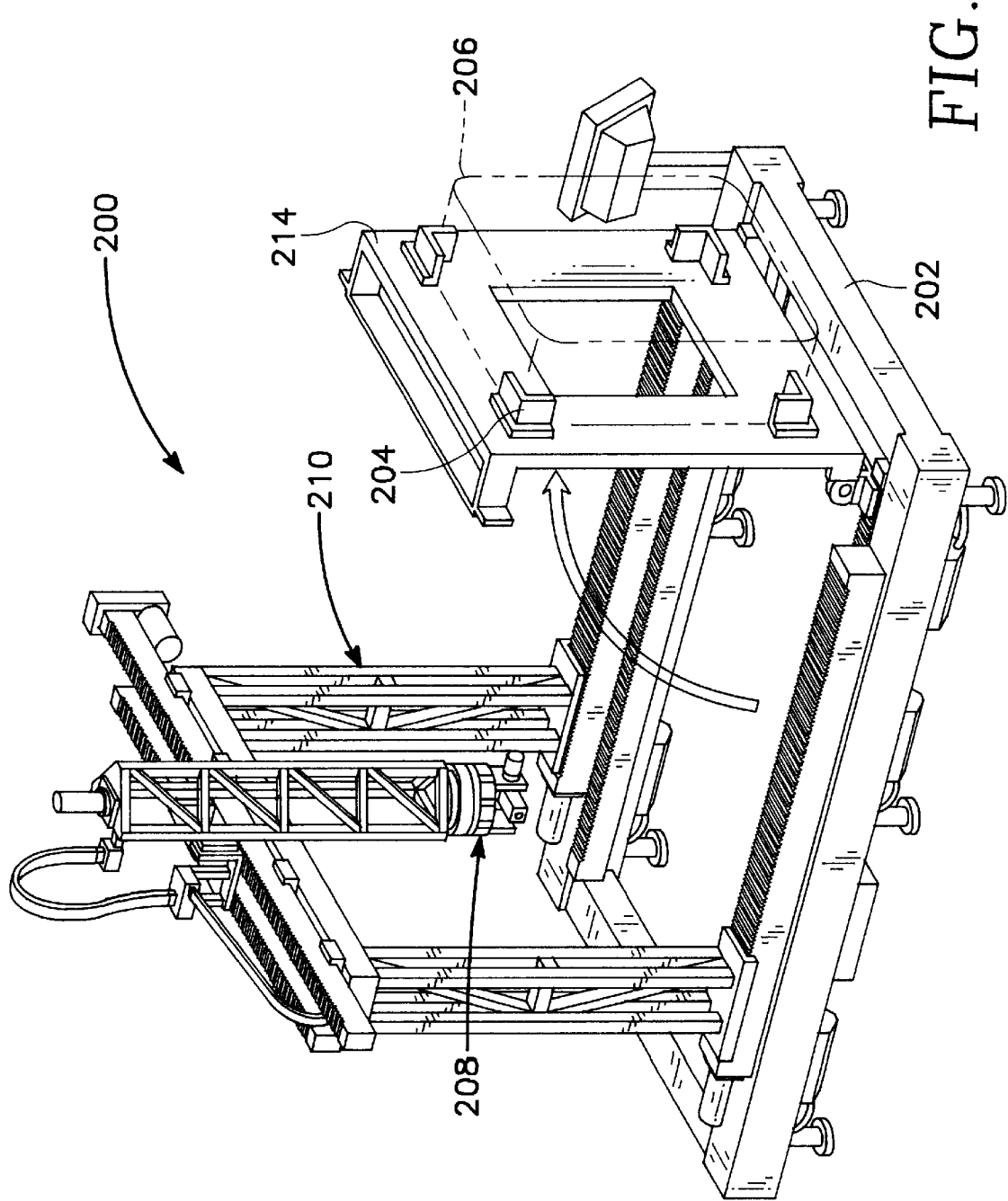
FIG. 5 is a perspective view illustrating the interaction of the sine plate with the tool of the present invention.

Referring to FIG. 5 along with FIG. 2A, the workpiece 206 is secured to the sine plate 214 by the reconfigurable holding mechanism 204. Any suitable reconfigurable holding means, preferably with datum plane locators, such as high precision adjustable clamps or high precision pneumatic suction devices can be used as the reconfigurable holding mechanism 204. A single workpiece 206 can be secured to the platform 202 or multiple workpieces can secured together first and then secured to the platform. For example, a plurality of workpieces can be first clamped together and then secured pneumatically to the platform by the reconfigurable holding mechanism 204.

The sine plate 214 is rotatably and slidably coupled to the platform 202. The sine plate 214 preferably rotates from a horizontal zero degree position to a vertical 90 degree position. Any suitable means, such as a rotatable joint, can be used to allow rotation of the sine plate 214. FIG. 2A illustrates the sine plate 214 at a horizontal position of zero degrees while FIG. 5 illustrates the sine plate 214 at a vertical position of 90 degrees. Also, the sine plate 214 of FIG. 2A is translatable along the platform 202 about the Y axis. Any suitable device, such as linear actuators with encoders, can be used to allow slidability of the sine plate 214 along the Y axis.

Rotation of the sine plate 214 allows easy access to the workpiece 206 from different angles. For instance, when the sine plate is at zero degrees (FIG. 2A), a portion of the workpiece 206 faces the platform 202 and is unaccessible. However, if the sine plate 214 is rotated to, for example, 90 degrees, that same unaccessible portion of the workpiece is now easily accessible. In addition, as will be discussed below in detail, rotation and translation of the sine plate 214 provides easy mating of connecting workpieces or transferability of the workpiece to other reconfigurable tools or other locations.

Operation

Figure 6:
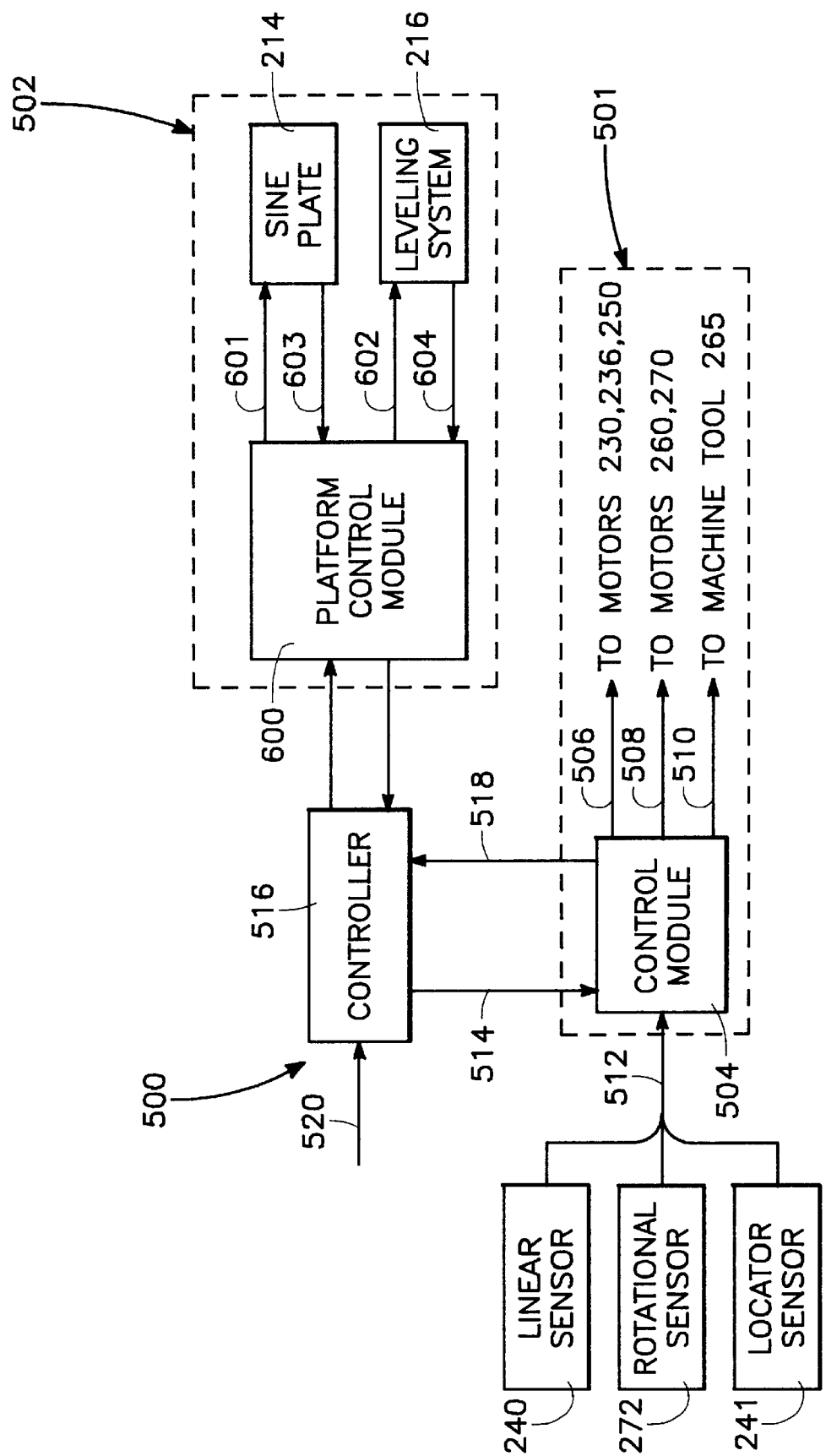
FIG. 6 is a block diagram of a control means for the system of FIG. 2A.

FIG. 6 is a block diagram of a controller for the system of FIGS. 2A and 2B. The reconfigurable tool 200 of FIG. 2A can be controlled by a controller 500 comprised of a tool computer numerical control (CNC) device 501 and a platform CNC device 502, respectively, as illustrated in FIG. 6.

For the tool computer numerical control (CNC) device 501, a conventional servo control module 504 sends translation signals 506 to the motors 230, 236, and 250 (shown in FIG. 2B), rotation signals 508 to the motors 260 and 270 (shown in FIG. 2B) and operation signals 510 to the machine tool 265 (shown in FIG. 2B). The module 504 receives sensor signals 512 from the linear sensors 240, rotational sensors 272, and locator sensors 241 (shown in FIG. 2B).

The sensor signals 512 measure the proximity of (a) the initial machining part of the machine tool 265 (e.g. the tip of a drill) to a desired set of X, Y and Z coordinates (referred to as the "vector"), (b) the orientation of the tool path (e.g. the drill centerline) to the contour of the workpiece surface (referred to as the "normal") as defined by rotation and pivot angles, and can also sense the location and position of the workpiece with respect to the tool 208.

The module also receives task signals 514 from a conventional industrial controller 516, and sends task completion signals 518 to the controller 516. The controller 516 generates the task signals 514 from a workpiece database 520 that is sent to the controller 516. The workpiece database 520 comprises a set of task signals 514 and defines the work to be performed on workpiece, such as the location, orientation and depth of holes.

As shown in FIG. 6 each task signal 514 defines a task to be performed on the workpiece and is generated by the controller 516. For example if the task is to drill a hole in the workpiece, a basic data item in the task signal 514 would be the location of the drill tip, i.e. the vector, and is defined by X, Y, and Z coordinates in relation to a workpiece reference datum. Another data item is the normal, which is defined by angles about the rotation and pivot axes at a selected vector. Other data to be defined could include the speed of the drill, the feed rate at which the drill moves with respect to the workpiece, and the distance that the drill is to travel (which determines the depth of the hole).

The controller 516 holds in memory each task signal 514 in the workpiece database 520. This workpiece database 520 could be provided by a computer aided design ("CAD") program defining a finished workpiece and could be entered in the controller 516 by manual or magnetic means.

In addition, the controller 516 determines when a task signal 514 (e.g. comprising the vector, normal, drill rates and distance) is sent to the control module 504. For example, the controller 516 could be programmed to send the task signal 514 to the module 504 only after a hole drilled pursuant to a previous task signal has been finished, i.e., a "when done" command.

When a task signal 514 is sent to the control module 504, it sends translation signals 506 and rotation signals 508 to move the machine tool 265 (shown in FIG. 2B) to the desired vector and normal. If the desired vector or normal of the task signal 514 is not reached by means of the translation signals 506 or rotation signals 508, one or more sensor signals 512 proportional to the error in coordinates or angles will be sent to the module 504. The module 504 then generates appropriate revised translation signals 506 or rotation signals 508 in order to make the correction in vector or normal. The translation signals 506 and rotation signals 508 also include a velocity command that directs the speed of the motors 230, 236, and 250 (shown in FIG. 2B) in order to control the time at which the desired vector will be reached.

After the desired position is reached, the module 504 sends the operation signal 510 (i.e. the remaining information from the task signal 514) to accomplish the desired work. For example when a drill reaches a desired vector and normal, the module 504 sends to a drill the operation signal 510, comprising a drill speed, drill feed rate, and a drill distance. After this operation signal 510 has been sent, module 504 sends the completion signal 518 to the controller 516, which then sends a subsequent task signal 514 to the module 504 and the operation is repeated until all the tasks in the workpiece database 520 have been completed.

In a second preferred embodiment, the linear sensors 240 and rotational sensors 272 (shown in FIG. 2B) are digital strip sensors. Digital strip sensors are cheaper and less expensive to use than conventional laser measuring means and do not adversely affect the performance of the system 200. This result can be a significant savings because laser sensors can cost as much as 20 percent of the overall cost of the system 200.

This embodiment is achieved by using the digital strips as the sensors to measure the vector of the machine tool 265 at maximum travel positions of each translation module 222, 232 and 234 (shown in FIG. 2B), and at several commanded intermediate positions. These vectors are compared with the location signals 506 (shown in FIG. 6) sent to reach each of the measured positions, and vector errors are determined for each module. This set of vector errors is programmed into the memory of the controller 516. After this calibration procedure, when the workpiece database 520 requires movement to a set of coordinates, the controller 516 corrects the task signal 514 by the amount of the vector errors. A similar calibration procedure is used to measure normal errors and to eliminate the need for rotational sensors 272.

The self leveling system 216 of the platform 202 of FIG. 2A operates in a similar manner as the self leveling system disclosed and described in U.S. Pat. No. 5,587,900, issued on Dec. 24, 1996 to Bullen, entitled SELF LEVELING INDEPENDENTLY PROGRAMMABLE SYSTEM, the teachings of which are incorporated herein by reference.

In a preferred embodiment, for platform control device 502, a platform control module 600 sends operation signals 601, 602 to the sine plate 214 and self leveling system 216 (shown in FIG. 2A), respectively. The module 600 also receives position and sensor signals 603, 604 from the sine plate 214 and self leveling system 216 (shown in FIG. 2A), respectively. The operation signals 601 provide rotation of the sine plate 214 between zero and 90 degrees. The operation signals 602 provide movement while the position and sensor signals provide specific position and locations to precisely level the system.

Working Example

Figure 7:
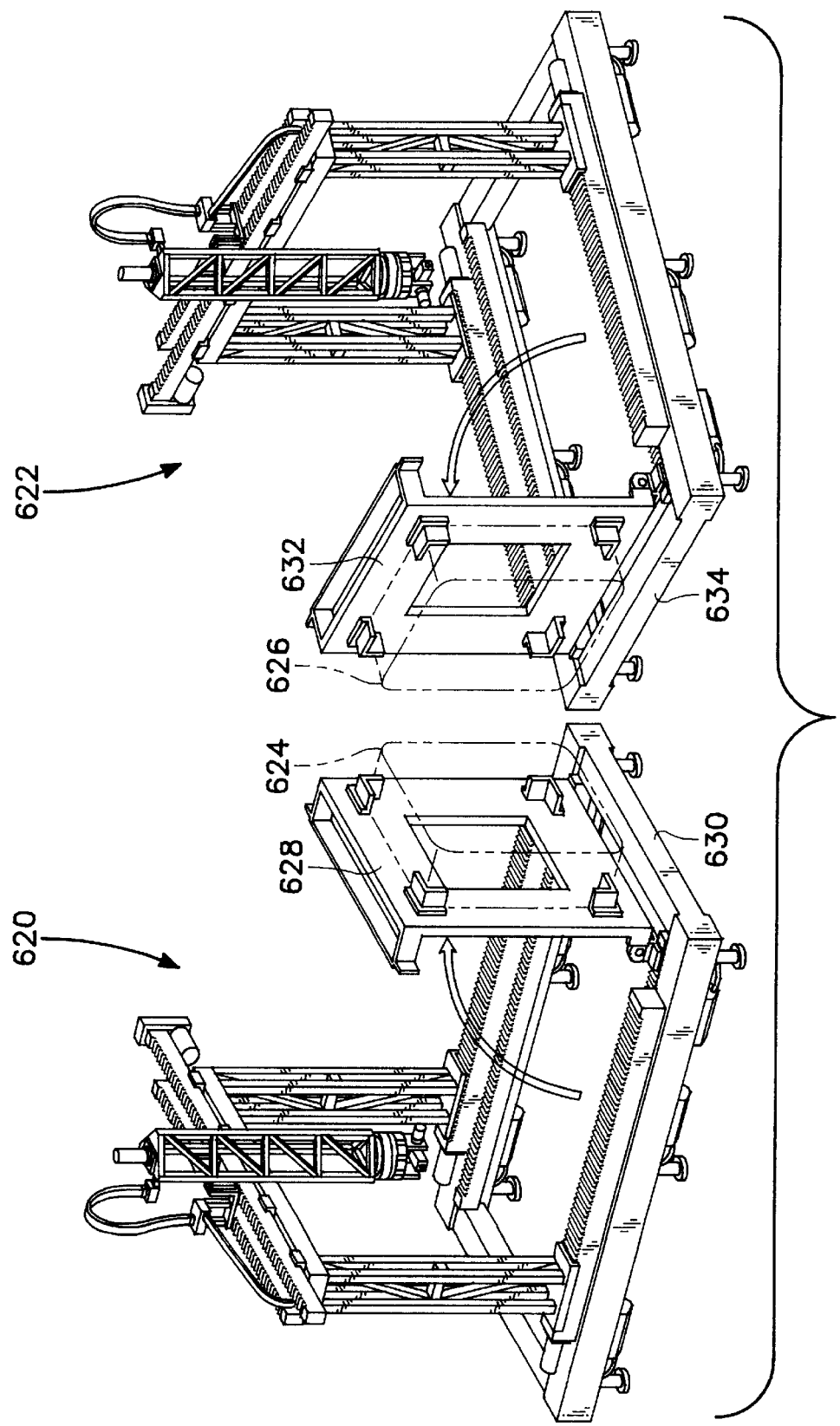
FIG. 7 is a perspective view illustrating the interaction of one tool coupled to another tool of the present invention.

FIG. 7 is a perspective view illustrating the interaction of one reconfigurable tool of the present invention coupled to another reconfigurable tool of the present invention. In certain instances, it may desirable to couple a first reconfigurable tool 620 to a second reconfigurable tool 622. This configuration provides easy mating of a first workpiece 624 of the first reconfigurable tool 620 to a second workpiece 626 second reconfigurable tool 622. Also, this configuration provides easy transferability of the first workpiece 624 to the second reconfigurable tool 622.

For example, for mating the first workpiece 624 with the second workpiece 626, the sine plate 628 of the first reconfigurable tool 620 is initially translated along the platform 630 to an appropriate position. Next, the sine plate 628 is rotated from zero to 90 degrees. A sine plate 632 of the second reconfigurable tool 622 is similarly translated along a platform 634 and rotated from to zero to 90 degrees. This provides the first and second workpieces 624, 626 in facing relationship, thereby allowing mating of the workpieces 624, 626. After the workpieces 624, 626 are properly mated, they can be easily transferred to another location or tool or can have tooling operations performed on them by either or both reconfigurable tools 620, 622.

Non-matrix Assembly Line

Figure 8:
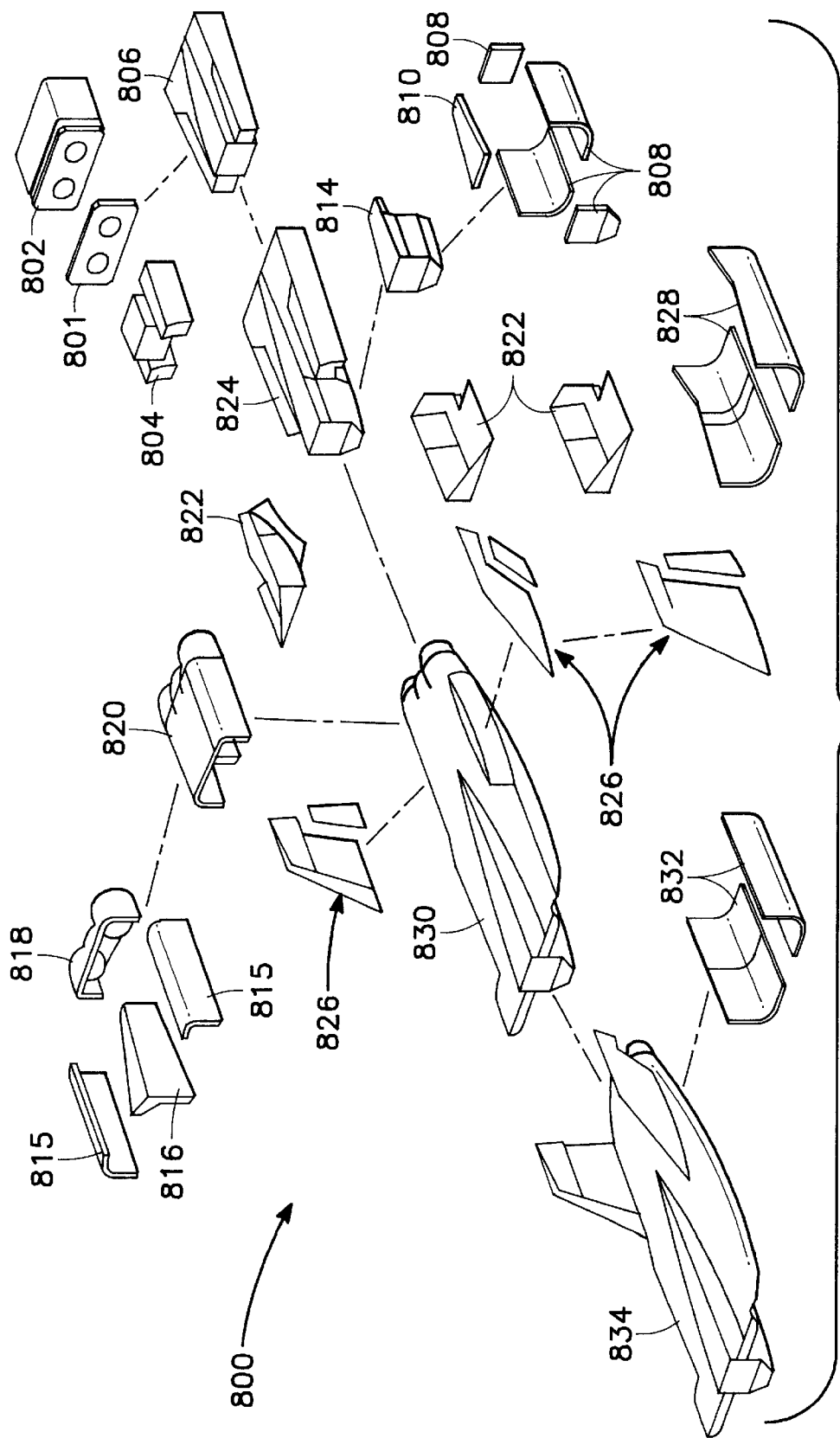
FIG. 8 is an assembly flow diagram illustrating the assembly of a part.

For example purposes only, FIG. 8 illustrates an assembly flow diagram of only a section of an example aircraft. As illustrated, the assembly the aircraft requires many subcomponents first connected together, second mated with other connected subcomponents, next mated with other different connected subcomponents, and so on.

As an example, first, bulkheads 801 are connected to form an aft duct structure 802 and an aft center fuselage center barrel 804. Second, the aft duct structure 802 and the aft center fuselage center barrel 804 are mated together to form an aft center fuselage 806. Third, forward side surrounding panels 808 and a top panel 810 are connected to form a forward center fuselage 814. Fourth, aft fuselage panels 815 are connected to an aft fuselage keel 816 and an aft fuselage nozzle 818 to form an aft fuselage mate 820. Fifth, inlet nacelles 822 are mated with the aft fuselage mate 820 and with the forward center fuselage 814. These two products are mated together to form a center fuselage mate 824. Sixth, vertical fins 826 and aft engine access doors 828 are mated with the center fuselage mate 824 to form a sub system installation and vertical attach 830. Next, forward engine access doors 832 are mated with the sub system installation and vertical attach 830 to form a center aft fuselage final assembly 834.

Current methods of assembling the structure of FIG. 8 include using a non-reconfigurable, fixed, custom matrix. To create the large structure, large assembly jigs, large drill bonnets, drill tools, drill hoods are needed. Workpieces are placed within the large assembly jigs. Next, work stands are elevated above the ground and are built around this arrangement in order to work on the workpiece. As a result, a large custom fixed matrix is produced with the expensive fixed assembly jigs as the building blocks of the structure.

Consequently, the devices and methods that comprises this technique are very expensive, inefficient, and waste resources. The present invention solves this problem and is embodied in a new apparatus and method for assembling large structures similar to the one depicted in FIG. 8. Such a structure can be assembled with the reconfigurable tool of FIGS. 2–7, as described below in FIG. 9, without expensive custom matrix devices.

Figure 9:
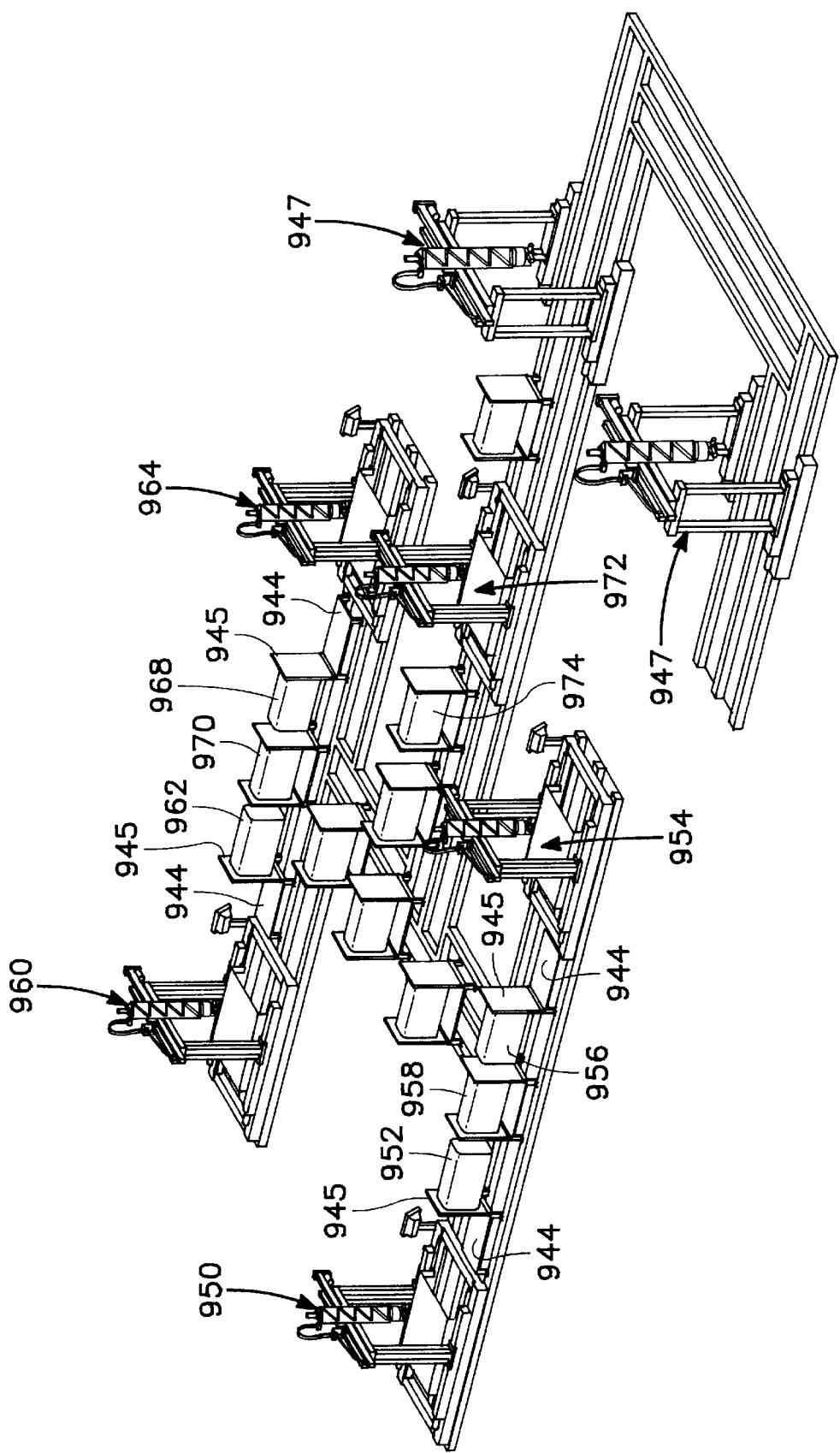
FIG. 9 is a perspective view of an assembly line utilizing the reconfigurable tool of the present invention.

FIG. 9 is a perspective view of an assembly line utilizing the reconfigurable tool of the present invention. A plurality of reconfigurable gantry tools with extended platforms 944 and sine plates 945 can be strategically coupled to one another to form a non-matrix assembly line. Further, other tooling systems 947 can be coupled to and/or within the reconfigurable gantry tool assembly line for performing additional operations other than those performed by the reconfigurable gantry tools. With this novel arrangement of the present invention, a non-matrix, non-custom, repeatable, and reconfigurable assembly line is produced. As a result, the workpieces, comprising the components and subcomponents of the final part to be built are the building blocks, and not the custom fixed assembly jigs. Also, the workpieces can be brought down to ground level and worked on at a comfortable location.

For example, as shown in FIG. 9, a first reconfigurable gantry tool 950 can be used to perform a tooling operation on part A 952. A second reconfigurable gantry tool 954 can be used to perform a tooling operation on part B 956. The first reconfigurable gantry tool 950 can be coupled to the second reconfigurable gantry tool 954 for mating part A 952 with part B 956 as part C 958. Similarly a third reconfigurable gantry tool 960 can be used to perform a tooling operation on part D 962. A fourth reconfigurable gantry tool 964 can be used to perform a tooling operation on part E 968. The third reconfigurable gantry tool 960 can be coupled to the fourth reconfigurable gantry tool 964 for mating part D 962 with part E 968 as part F 970.

The third and fourth reconfigurable gantry tools 960, 964 can perform the identical operation of the first and second reconfigurable gantry tools 950, 954 so that part C 958 and F 970 are identical parts. A sixth reconfigurable gantry tool 972 can be used to perform a tooling operation on part H 974, which can be sent to a seventh reconfigurable gantry tool 976 or another tool for perform a tooling operation on part H 974. Part H 974 can then be either transferred to another assembly line or mated with part C 958 and/or part F 970 via their respective sine plates 945 as discussed above.

Alternatively, the first and second reconfigurable gantry tools 950, 954 can perform different operations than the first and second reconfigurable gantry tools 950, 954. In this case, a fifth reconfigurable gantry tool can be located between the first and second and third and fourth reconfigurable gantry tools 950, 954, 960, 964 to mate part C 958 with part F 970 to form a new part, which can then be mated with part H 974, sent to tools 947 for other processing, sent to another reconfigurable tool for mating with another part, or sent to another location.

As can be seen from FIG. 9, many modifications to the assembly line can be made by strategically combining reconfigurable gantry tools and other tools in order to assemble a product such as the one depicted in FIG. 8.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A reconfigurable gantry tool for performing tooling operations on a workpiece, comprising:

a movable platform;

a sine plate rotatably and slidably coupled to said platform;

a numerical controlled gantry slidably coupled to said platform to allow multi-axis movement of a toc supported by, said gantry for performing tooling operations on said workpiece; and a multi-movement control device coupled to said platform, sine plate, and gantry for controlling movement of said coupled devices.

2. The system of claim 1, wherein said reconfigurable gantry tool platform further includes a self leveler.

3. The system of claim 2, wherein said reconfigurable gantry tool is a first reconfigurable gantry tool, wherein said system further comprises a second reconfigurable gantry tool coupled to said first reconfigurable gantry tool for receiving said workpiece from said sine plate.

4. The system of claim 1, wherein said gantry further includes an automatic locator for properly locating and aligning said gantry with a selected location on said workpiece.

5. The system of claim 1, wherein said gantry comprises:

a robotic arm having an end machine tool and a rotator for rotating said end machine tool about a rotational axis and a pivotor for pivoting said end machine tool about any pivot axis orthogonal to said rotational axis;

a vertical translation module coupled to said robotic arm and having a vertical movement device for translating said robotic arm along a Z axis;

a plurality of longitudinal translation modules coupled to said robotic arm and said platform and having a longitudinal movement device for translating said longitudinal translation modules along a y axis of said platform; and a transverse translation module coupled to said robotic arm and said vertical translation module and having a transverse movement device for translating said transverse translation module along an X axis.

6. The system of claim 5 wherein each of said translation module further comprises:

a rail for supporting each of said respective module; and a linear ballscrew threadedly engaged with each of said respective module.

7. The system of claim 5 wherein each of said movement device of each of said translation modules further comprises:

a motor connected to each of said respective translation module for moving each of said respective module.

8. The system of claim 7 further comprising:

a belt reduction drive connecting said motor to each of said respective translation module.

9. The system of claim 5 wherein said vertical translation module further comprises:

a secondary vertical translation module aligned parallel to said vertical translation module and connected to said vertical movement device.

10. The system of claim 5 wherein said control device comprises:

a controller for storing control signals for each of said respective movement device and for said machine tool, and sending said control signals to each of said respective movement device and said machine tool at predetermined intervals.

11. The system of claim 10 wherein said control signals for each of said respective movement device further comprise:

a set of cartesian coordinates for each of said respective movement devices; and a set of angles for each of said rotator and pivotor.

12. The system of claim 11 wherein said control signals for said machine tool further comprise:

a set of machine tool operation instructions.

13. The system of claim 5 wherein:

each of said translation modules, rotator, and pivotor further comprises a sensor for measuring a position of each of said respective translation modules and a position of said machine tool about said rotational axis and said pivot axis, and sending a position signal;

a controller for storing control signals for each of said respective movement device and for said machine tool, and sending said control signals; and a control module for receiving each of said respective control signals, sending each of said respective control signals to each of said respective movement devices and to said machine tool, receiving each of said respective sensor position signals, and sending position correction signals to each of said respective movement devices.

14. The system of claim 5 further comprising:

a ballrail mounted parallel to said transverse translation module on a side opposite to said vertical translation module;

a sliding device connected to said transverse translation module and engaging said ballrail so as to constrain transverse movement of said transverse translation module and to prevent vertical movement of said transverse translation module.

15. A reconfigurable gantry tool, comprising:

a movable platform;

a sine plate rotatably and slidably coupled to said platform;

a reconfigurable holding device coupled to said sine plate for securing a workpiece;

a gantry frame slidably coupled to said platform;

a robotic arm slidably coupled to said gantry frame, said robotic arm having a multi-axis numerical controlled tool for performing tooling operations on said workpiece; and a multi-movement control device coupled to said platform, sine plate, gantry frame, and robotic arm for controlling movement of said coupled devices.

16. The system of claim 15, wherein said reconfigurable gantry tool further includes a self leveler.

17. The system of claim 16, wherein said self leveler is a horizon leveling system.

18. The system of claim 15, wherein said gantry further includes an automatic locator for properly locating and aligning said gantry with a selected location on said workpiece.

19. The system of claim 15, wherein said gantry frame comprises a vertical translation module coupled to said robotic arm and having a vertical movement device for translating said robotic arm along a Z axis, a plurality of longitudinal translation modules coupled to said robotic arm and said platform and having a longitudinal movement device for translating said longitudinal translation modules along a y axis of said platform, and a transverse translation module coupled to said robotic arm and said vertical translation module and having a transverse movement device for translating said transverse translation module along an X axis.

20. The system of claim 15, wherein said robotic arm has an end machine tool and a rotator for rotating said end machine tool about a rotational axis and a pivotor for pivoting said end machine tool about any pivot axis orthogonal to said rotational axis.

21. The system of claim 15, wherein said reconfigurable gantry tool is a first reconfigurable gantry tool, wherein said system further comprises a second reconfigurable gantry tool coupled to said first reconfigurable gantry tool for receiving said workpiece from said sine plate.

* * * * *